United States Patent
Storer

(10) Patent No.: US 6,612,595 B1
(45) Date of Patent: Sep. 2, 2003

(54) GRILLE GUARD WITH FOOTSTEP

(76) Inventor: Ron D. Storer, 3015 San Juan Dr., Fullerton, CA (US) 92635

( * ) Notice: Subject to any disclaimer, the term of this patent is extended or adjusted under 35 U.S.C. 154(b) by 720 days.

(21) Appl. No.: 08/654,739

(22) Filed: May 29, 1996

(51) Int. Cl.[7] ................................................. B60R 3/00
(52) U.S. Cl. ...................... 280/163; 280/164.1; 293/117
(58) Field of Search ............................... 280/163, 164.1, 280/164.2, 291; 293/115, 116, 117

(56) References Cited

U.S. PATENT DOCUMENTS

| | | | | |
|---|---|---|---|---|
| 2,649,308 A | * | 8/1953 | Bice, Jr. | 293/117 X |
| 3,774,952 A | * | 11/1973 | Zorn | 293/117 |
| 4,274,648 A | * | 6/1981 | Robins | 293/117 X |
| 4,753,447 A | * | 6/1988 | Hall | 280/163 |
| 4,825,975 A | * | 5/1989 | Symes | 280/163 X |
| 5,067,760 A | * | 11/1991 | Moore et al. | 280/164.1 X |
| 5,139,295 A | * | 8/1992 | Escobedo | 293/117 |

FOREIGN PATENT DOCUMENTS

GB 323468 * 12/1929 ................. 280/163

OTHER PUBLICATIONS

Go Rhino! Catalog 960; 8 pages, 1996.

* cited by examiner

*Primary Examiner*—Pam Rodriguez
(74) *Attorney, Agent, or Firm*—Luce, Forward, Hamilton & Scripps LLP

(57) ABSTRACT

A grille guard for an automobile has a footstep for facilitating safe and easy access to the hood and engine compartment thereof. The footstep is defined by a generally tubular horizontal member having a flattened portion formed along the upper surface thereof and preferably having a non-skid surface formed thereupon.

16 Claims, 1 Drawing Sheet

GRILLE GUARD WITH FOOTSTEP

FIELD OF THE INVENTION

The present invention relates generally to automotive accessories for enhancing the styling and functionality of trucks and sport utility vehicles. The present invention relates more particularly to a grille guard for trucks and sport utility vehicles, wherein the grille guard comprises a footstep for enhancing access to the hood and engine compartment of the trucks and sport utility vehicles.

BACKGROUND OF THE INVENTION

Grille guards, brush guards, and the like for protecting the front end of trucks, sport utility vehicles, and other automobiles are well known. Such grille and brush guards are commonly mounted to the front ends of such vehicles so as to prevent damage thereto during off road use. During off road use such vehicles are subject to damage caused by rocks, tree limbs and other such matter which is typically present in the outdoors.

Further, grille and brush guards provide an aesthetic appearance which appeals to many vehicle owners. Thus, grille and brush guards are frequently mounted to an automobile whether or not off road use is contemplated.

As those skilled in the art will appreciate. Such grille and brush guards typically comprise a plurality of horizontally extending, typically tubular members which generally cover the grille and headlights of the automobile. Typically, two vertical members extend downwardly from the horizontal members to facilitate more rigid attachment of the horizontal members to the automobile and also to facilitate the attachment of various accessories thereto. The vertical members typically comprise sheet metal or metal plate having a right angle bend formed therein for strength. The vertical members alternatively are comprised of two pieces of sheet metal or metal plate which are welded together to form a T cross-section.

Such accessories typically comprise winches, winch hooks, resilient members or rubber bumpers, license plate holders, etc.

Trucks and sport utility vehicles on which such grille guards are installed frequently have larger than standard wheels and modified suspension, which cooperate to raise the vehicle's body to a height substantially greater than that of a stock vehicle. This is typically done both for cosmetic reasons and to allow the vehicle to ride over obstructions, i.e., rocks, fallen trees, etc., without causing damage to the vehicle.

Although such raised vehicles possess aesthetic and functional characteristics desirable to those who own and use them, certain disadvantages are inherent in such modifications. For example, raising the vehicle makes access to the hood and/or engine compartment substantially more difficult than is the case with an unmodified vehicle.

Thus, when access to the hood and/or engine compartment is desired, as when washing the vehicle and when performing maintenance thereon, it is frequently necessary to obtain a footstool or the like. However, the requirement for such a footstool represents a substantial inconvenience.

When a footstool is not available, it is known to climb upon the grille guard and/or other portions of the automobile, so as to provide access to the hood and/or engine compartment. However, such climbing about upon the grille guard and/or automobile is undesirable for a variety of different reasons.

Climbing upon the grille guard and/or automobile creates the potential for incurring damage to the vehicle. For example, portions of the grille guard and/or vehicle which are stepped upon may become dented, bent and/or scratched.

More importantly, such climbing about on the grille guard and/or automobile presents the potential for injury to the person doing so. Such person is subject to slipping, and/or falling from the automobile. As those skilled in the art will appreciate, substantial and devastating injuries can result from such slips and/or falls.

Climbing about upon the grille guard and/or automobile is particularly dangerous when the person doing so is attempting to obtain better access to the engine compartment when the engine is running. This situation commonly occurs when maintenance is being performed upon the vehicle. A slight slip by a person positioned over or proximate to an engine compartment can result in inadvertent undesirable contact with moving and/or hot components of the engine, thus substantially enhancing the opportunity for injury.

In view of the foregoing, it is desirable to provide means for enhancing access to the hood and engine compartment of a truck or sport utility vehicle which has been raised sufficiently to make access thereto otherwise difficult.

SUMMARY OF THE INVENTION

The present invention specifically addresses and alleviates the above mentioned deficiencies associated with the prior art. More particularly, the present invention comprises a grille guard for an automobile, wherein the grille guard comprises at least one first grille guard member extending generally horizontally so as to protect a portion of the automobile's front, at least one second grille guard member extending generally vertically and formed to said at least one first grille guard member, and a footstep formed to said at least one second grille guard member proximate a lower end thereof.

The step preferably comprises a generally tubular horizontal member and a flattened portion formed in the generally tubular horizontal member, upon which a person may conveniently and safely step without causing damage to either the automobile or the grille guard.

Preferably, a non-skid surface is formed upon the flattened portion of the generally tubular horizontal member. Preferably, a rubber covering is formed upon the flattened portion of the generally tubular horizontal member or step. As used herein, the term rubber is defined to include durable resilient materials such as natural and artificial rubber, as well as various polymer materials. As those skilled in the art will appreciate, various different other materials are likewise suitable for use upon the flattened portion of the generally tubular horizontal member. The rubber covering preferably comprises tread formed therein, so as to enhance its non-skid capabilities.

Optionally, the flattened portion of the generally tubular horizontal member is knurled and/or covered with a sandpaper-like non-skid material.

A bracket is formed at each end of the footstep for attaching the footstep to two second grille guard members. One bracket is preferably formed within each open end of the tubular footstep and each bracket preferably comprises an elongate bar or attachment member having two threaded holes formed therein to facilitate attachment to the grille guard via threaded fasteners such as bolts. Alternatively, each bracket comprises a U-shaped attachment member. Alternatively, the tubular member may be welded directly to the two vertically extending second grille guard members, preferably proximate the lower ends thereof.

The footstep is preferably formed by pressing the tubular member to form the flattened portion thereon. As those skilled in the art will appreciate, various jigs, fixtures, molds, dies, tools, etc., may be utilized with various types of presses to form the desired flattened portion of the tubular member.

The grille guard with footstep of the present invention provides a safe and easy means for obtaining access to the hood and/or engine compartment of a raised vehicle. Thus, by stepping upon the footstep portion of the grille guard of the present invention, one may easily wash the vehicle's hood and/or perform maintenance upon the engine. The footstep of the present invention provides a sturdy structural member, easily capable of withstanding the weight of a person, which is not subject to scratching, bending, bowing, breaking, etc., such as that which frequently occurs when a person climbs upon a prior art grille guard and/or automobile.

These, as well as other advantages of the present invention will be more apparent from the following description and drawings. It is understood that changes in the specific structure shown and described may be made within the scope of the claims without departing from the spirit of the invention.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and the sequence of steps for constructing and operating the invention in connection with the illustrated embodiment. It is to be understood, however, that the same or equivalent functions may be accomplished by different embodiments that are also intended to be encompassed within the spirit and scope of the invention.

The grille and brush guard of the present invention is illustrated in FIGS. 1–4 which depict a presently preferred embodiment of the invention.

Figure 1:
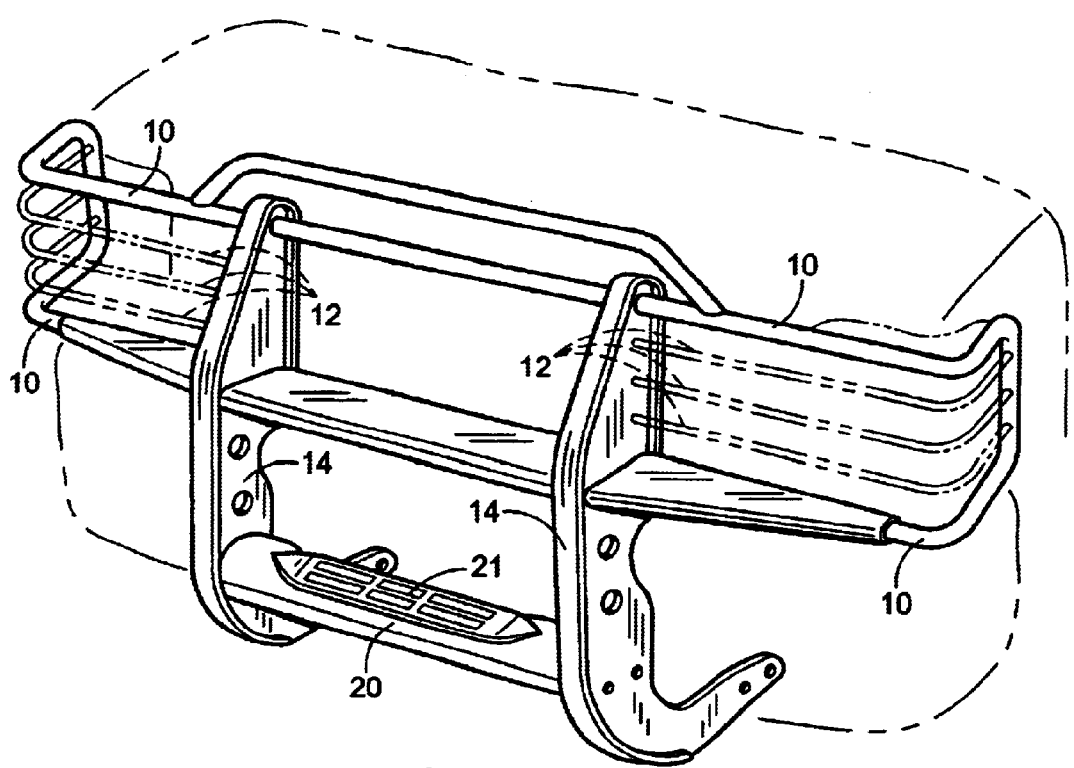
FIG. 1 is a front perspective view of a grille and brush guard having a footstep formed to the lowermost ends of the vertical members thereof, according to the present invention.
Figure 2:
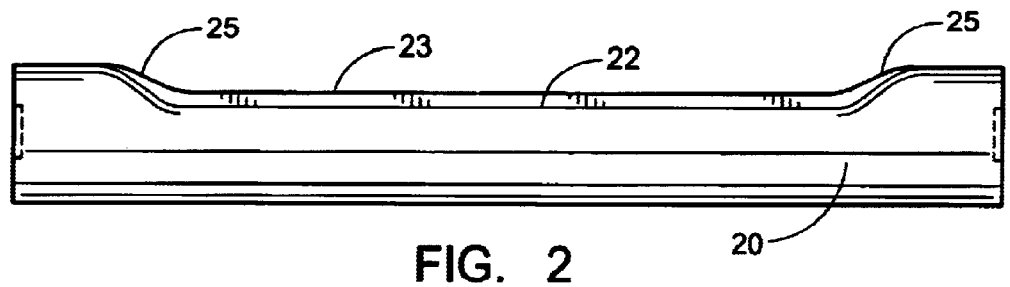
FIG. 2 is a side view of the footstep of FIG. 1.
Figures 3, 4:
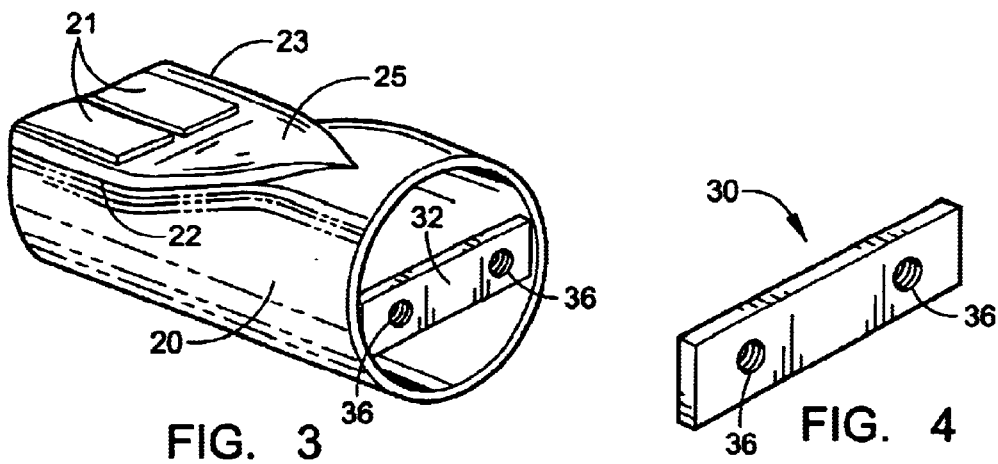
FIG. 3 is an enlarged perspective view of one end of the footstep of FIG. 1 showing the attachment member disposed therein for mounting the footstep to the grille and brush guard.
FIG. 4 is an enlarged perspective view of the attachment member of FIG. 3.

Referring now to FIGS. 1–3, the present invention generally comprises a grille and brush guard having at least one, preferably two, generally horizontal tubular members 10 configured so as to extend generally proximate the grille and/or front lights of the vehicle. Preferably, a plurality of smaller generally horizontal heavy gauge wire or bar members 12 extend generally parallel to horizontal tubular members 10.

At least one, preferably two vertical members 14 extend generally vertically to interconnect the horizontal tubular members 10 and the horizontal bars 12. The vertical members 14 preferably comprise either sheet metal or metal plate and are preferably welded to the horizontal tubular members 10 and the horizontal bars 12. The vertical members 14 provide for rigid attachment of the grille and brush guard to the vehicle's frame. The generally vertical members 14 also facilitate the attachment of various accessories to the grille and brush guard. For example, a winch, winch hooks, resilient members or rubber bumpers, license plate holder, etc., may be mounted upon the vertical members 14, as desired.

A footstep 20 extends between the two generally vertical members 14, proximate the lowermost ends thereof.

The footstep 20 is formed from a tubular member, preferably having an outer diameter of approximately three inches and having a sufficient wall thickness to safely support a person. The tubular footstep 20 may either be permanently or removably attached to the two vertical members 14, as discussed in detail below. The use of a tubular member having an outer diameter of approximately three inches assures that adequate surface area is provided for a safe and comfortable foothold.

Referring now to FIGS. 2 and 3, the tubular footstep 20 comprises a flattened portion 22 formed upon the upper surface thereof, so as to define a generally horizontal planar region upon which a person may step. The flattened portion 22 defines a surface having sufficient area to mitigate the potential for slipping. Further, the flattened portion 22 provides a surface which is substantially more comfortable to stand upon than would be the rounded surface of the tubular member 20. Indeed, the flattened portion 22 provides a substantially safer and more comfortable foothold than does other portions of the automobile or grille guard. As such, use of the footstep 20 to gain access to the hood and/or engine compartment of a raised vehicle substantially reduces the probability of incurring injury or damaging the vehicle.

According to the preferred embodiment of the present invention, a non-skid surface 23 is formed upon the flattened portion 22, so as to further prevent slipping thereupon. The non-skid surface 23 preferably comprises upwardly inclined end portions 25, such that substantially the entire flattened portion 22 is covered thereby. Preferably, the non-skid surface 23 comprises a coating of rubber or the like having treads 21 formed therein, so as to facilitate desirable frictional engagement thereof with the soles of a person's shoes. As those skilled in the art will appreciate, various different tread configurations are suitable.

Alternatively, the non-skid surface may be formed via knurling or the application of a sandpaper-like non-skid preparation thereto. Those skilled in the art will appreciate that various other non-skid surfaces may likewise be utilized.

Referring now to FIGS. 3 and 4, according to the preferred embodiment of the present invention an elongate attachment member 30 is utilized to removably attach the tubular member defining the footstep 20 to the generally vertical members 14. The attachment member 30 comprises a body 32 having threaded holes 36, preferably a pair thereof, formed in the body 32. The attachment member 30 is preferably welded to the interior of the footstep 20. The attachment member 30 is preferably welded in place such that the outer surface of the main body 32 thereof is generally co-planar with the end of the footstep 20, such that footstep 20 may be conveniently secured to the vertical members 14 via threaded fasteners, such as bolts.

Alternatively, the footstep 20 is welded to the vertical members 14. Those skilled in the art will appreciate that various other means for attaching the tubular member 20 to the vertical members 14 are likewise suitable.

Thus, according to the present invention, a footstep is provided which is capable of supporting the weight of a person in a manner which does not cause damage to the automobile and/or the grille and brush guard and which enhances safety to the person by providing a stable and non-skid surface upon which to stand.

It is understood that the exemplary grille and brush guard for an automobile described herein and shown in the drawings represents only a presently preferred embodiment of the invention. Indeed, various modifications and additions may be made to such embodiment without departing from the spirit and scope of the invention. For example, as those skilled in the art will appreciate, the footstep may be of a variety of different configurations. For example, the footstep may have a triangular, square, rectangular, hexagonal, octagonal, etc. cross-sectional configuration. Indeed, the footstep may be of any desired cross-sectional configuration, as long as the upper surface thereof is generally flat over a sufficient area, so as to provide ample room upon which to safely and comfortably stand. Thus, these and other modifications and additions may be obvious to those skilled in the art and may be implemented to adapt the present invention for use in a variety of different applications.

What is claimed is:

1. A grille guard for an automobile, said grille guard comprising:
   a) at least one first grille guard member extending generally horizontally so as to protect a portion of an automobile's front;
   b) at least one second grille guard member extending generally vertically and formed to said at least one first grille guard member;
   c) a footstep to said at least one second grille guard member proximate a lower end thereof, the footstep being disposed in weight-supportive attachment with said at least one second grille guard, the weight-supportive attachment being sufficient to resist a person's weight said step comprising:
      i) a generally tubular horizontal member formed of a material sufficient to resist bending due to the force of a person's weight thereon; and
      ii) an integrated flattened portion formed in said generally tubular horizontal member for providing a user with a structural visual cue that said flattened portion is to be used for stepping upon.

2. The grille guard as recited in claim 1, further comprising a non-skid surface formed upon the flattened portion of said generally tubular horizontal member.

3. The grille guard as recited in claim 1, further comprising a rubber covering formed upon the flattened portion of said generally tubular horizontal member.

4. The grille guard as recited in claim 1, further comprising a rubber covering formed upon the flattened portion of said generally tubular horizontal member, said rubber covering comprising treads formed therein so as to enhance a user's footing thereupon.

5. The grille guard as recited in claim 1, wherein said at least one second grille guard member comprising two second grille guard members and said grille guard further comprising a bracket formed at each end of said footstep for attaching said footstep to the two second grille guard members.

6. grille guard as recited in claim 1, wherein said at least one second grille guard member comprising two second grille guard members and said grille guard further comprising a bracket formed within each end of said footstep for attaching said footstep to the two second grille guard members.

7. The grille guard as recited in claim 1, wherein said at least one second grille guard member comprising two second grille guard members and said grille guard further comprising a bracket welded within each end of said footstep for attaching said footstep to the two second grille guard members.

8. The grille guard as recited in claim 1, wherein said at least one second grille guard member comprising two second grille guard members and said grille guard further comprising a U-shaped bracket welded within each end of said footstep, each U-shaped bracket having two threaded holes formed therein for attaching said footstep to the two second grille guard members.

9. A method for forming a grille guard for an automobile, said method comprising the steps of:
   a) providing at least one first grille guard member configured to extend generally horizontally so as to protect a portion of the automobile's front;
   b) providing at least one second grille guard member configured to extend generally vertically;
   c) attaching said at least one first grille guard member to said at least one second grille guard member;
   d) forming a footstep according to a method comprising the steps of:
      i) providing a tubular member of a desired length to define a step, the tubular member being formed of a material sufficient to resist bending due to the force of a person's weight thereon;
      ii) pressing the tubular member to form an integrated flattened portion thereon for providing a user with a structural visual cue that said flattened portion is to be used for stepping upon; and
   e) attaching the footstep to said at least one second grille guard member proximate a lower end thereof with such attachment force so as to sufficiently resist a person's weight.

10. The method as recited in claim 9, further comprising the step of forming a non-skid surface upon the flattened portion of said generally tubular horizontal member.

11. The method as recited in claim 9, further comprising the step of applying a rubber covering to the flattened portion of said generally tubular horizontal member.

12. The method as recited in claim 9, further comprising the step of forming a rubber covering having treads formed therein upon the flattened portion of said generally tubular horizontal member.

13. The method as recited in claim 9, wherein the step of providing at least one second grille guard member comprises of providing two second grille guard members and the method further comprising the step of forming a bracket at each end of said tubular member, the brackets facilitating attachment of the tubular member to the two second grille guard members.

14. The method as recited in claim 9, wherein the step of providing at least one second grille guard member comprises of providing two second grille guard members and the method further comprising the step of forming a bracket within each end of said tubular member, the brackets facilitating attachment of the tubular member to the two second grille guard members.

15. The method as recited in claim 9, wherein the step of providing at least one second grille guard member comprises of providing two second grille guard members and the method further comprising the step of welding a bracket within each end of the tubular member, the brackets facilitating attachment of the tubular member to the two second grille guard members.

16. The method as recited in claim 9, wherein the step of providing at least one second grille guard member comprises of providing two second grille guard members and the method further comprising the step of welding a U-shaped bracket within each end of the tubular member, each U-shaped bracket having two threaded holes formed therein for attaching the tubular member to the two second grille guard members.

* * * * *